(12) United States Patent
Gandhewar et al.

(10) Patent No.: US 10,798,645 B2
(45) Date of Patent: Oct. 6, 2020

(54) EXTENDING SUBSCRIBER SERVICES TO ROAMING WIRELESS USER EQUIPMENT

(71) Applicant: Juniper Networks, Inc., Sunnyvale, CA (US)

(72) Inventors: Sunil Madhaorao Gandhewar, Umarkhed (IN); Anand Vijayvergiya, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 98 days.

(21) Appl. No.: 16/009,771

(22) Filed: Jun. 15, 2018

(65) Prior Publication Data

US 2019/0387465 A1    Dec. 19, 2019

(51) Int. Cl.
    *H04W 48/18*      (2009.01)
    *H04W 4/24*      (2018.01)
    *H04W 12/06*      (2009.01)
    *H04W 28/24*      (2009.01)
    *H04W 48/14*      (2009.01)

(52) U.S. Cl.
CPC ............ *H04W 48/18* (2013.01); *H04W 4/24* (2013.01); *H04W 12/06* (2013.01); *H04W 28/24* (2013.01); *H04W 48/14* (2013.01)

(58) Field of Classification Search
CPC ....... H04W 48/18; H04W 4/24; H04W 12/06; H04W 28/24; H04W 48/14
See application file for complete search history.

(56) References Cited

U.S. PATENT DOCUMENTS

2006/0079228 A1* 4/2006 Marsico ............ H04W 12/0602
    455/433
2007/0245007 A1* 10/2007 Tsirtsis .................... H04W 8/04
    709/223

(Continued)

FOREIGN PATENT DOCUMENTS

EP      2713583 A1      4/2014

OTHER PUBLICATIONS

Extended Search Report from counterpart European Application No. 19165277.5, dated Jun. 19, 2019, 12 pp.

(Continued)

*Primary Examiner* — Ajay Cattungal
(74) *Attorney, Agent, or Firm* — Shumaker & Sieffert, P.A.

(57) ABSTRACT

A network device includes one or more processors configured to process, a request, from a subscriber device, via a wireless connection device, for network parameters for accessing one or more services provided by a service provider network, the request for network parameters comprising identifying data associated with a subscriber of the service provider network and output, to a service server, an authentication request for the subscriber device, the authentication request indicating the identifying data. In response to receiving an authentication reply indicating the authentication request for the subscriber device has been approved and a service profile for the subscriber, the one or more processors are configured to output, to the wireless connection device, configuration information corresponding to the service profile for the subscriber and output, to the subscriber device, network parameters for accessing the one or more services provided by the service provider network.

31 Claims, 7 Drawing Sheets

(56) References Cited

U.S. PATENT DOCUMENTS

| | | | | |
|---|---|---|---|---|
| 2010/0107225 A1* | 4/2010 | Spencer | ............ | H04W 12/0609 |
| | | | | 726/4 |
| 2010/0332615 A1* | 12/2010 | Short | ................. | H04L 61/1511 |
| | | | | 709/217 |
| 2012/0192258 A1* | 7/2012 | Spencer | .............. | H04W 12/003 |
| | | | | 726/7 |
| 2014/0092899 A1* | 4/2014 | Krishna | ............ | H04L 29/12245 |
| | | | | 370/389 |
| 2015/0095936 A1* | 4/2015 | Yu | ....................... | H04N 21/4334 |
| | | | | 725/28 |
| 2017/0093855 A1* | 3/2017 | Perez | .................... | H04W 4/025 |
| 2018/0013618 A1* | 1/2018 | Theogaraj | ............... | H04L 67/42 |
| 2018/0048540 A1* | 2/2018 | Zhang | ................... | H04L 45/745 |
| 2018/0063564 A1* | 3/2018 | Phatak | ............. | H04N 21/25816 |
| 2018/0324105 A1* | 11/2018 | Gillon | ................. | H04L 12/2801 |

OTHER PUBLICATIONS

Response to Extended Search Report dated Jun. 19, 2019 from counterpart European Application No. 19165277.5, dated Jun. 16, 2020, 17 pp.

\* cited by examiner

EXTENDING SUBSCRIBER SERVICES TO ROAMING WIRELESS USER EQUIPMENT

TECHNICAL FIELD

Techniques described herein relate to accessing broadband networks using wireless devices and, more particularly, to configuring roaming wireless connection devices to provide a subscribed level of service to wireless devices.

BACKGROUND

Service providers deploy Wi-Fi® hotspots that permit existing subscribers to access network services rather than using a cellular connection, such as so-called third generation (3G) or fourth generation (4G) wireless mobile telecommunication technologies. For example, a subscriber may connect a mobile device to a Wi-Fi® network and access network services according to a general service profile. In this way, an existing subscriber may access network services via the Wi-Fi® network, which may provide connectivity to the network services and also reduce costs associated with providing services via the cellular connection.

SUMMARY

In general, techniques are described herein for associating a subscriber device wirelessly connected to a subscriber network using a wireless access point (WAP), e.g., Wi-Fi® hotspots, with a subscriber account for broadband or mobile services to provide a subscribed level of service (e.g., latency, bandwidth, etc.) for accessing broadband services. That is, rather than subscriber information (e.g., a user name, customer number, etc.) being inaccessible, the subscriber information may be provided to an authentication, authorization, and accounting (AAA) server (e.g., Remote Authentication Dial-In User Service (RADIUS) server, diameter server, etc.). The subscriber information may be used to, for example, log into an internet service provider (ISP) (e.g., broadband service provider). In this way, the AAA server (which may also be referred to as a "service server") may identify a service profile for the particular subscriber using the subscriber information to provide a subscribed level of service rather than a general service profile that is not associated with any one subscriber of a broadband service (e.g., a mobile subscriber). Further, in some examples, the AAA server may receive accounting packets that are based on the subscriber information.

One or more techniques described herein may improve an operation of a network device. For example, a network device may utilize a subscriber profile for a particular subscriber to configure a wireless connection device (e.g., a wireless access point, Wi-Fi® hotspot, etc.) with a subscribed level of service. In some examples, a network device may utilize a subscriber identifier and/or a device identifier to associate a usage of network services (e.g., a throughput of data transferred to and from subscriber devices) by the particular subscriber. Again, the subscriber identifier may be used to, for example, log into an internet service provider (ISP) (e.g., broadband service provider) using a software application, web link (e.g., URL), or another out-of-band mechanism. Moreover, one or more techniques described herein may improve a customer experience. For example, a network device may configure a wireless connection device to provide improved network access to subscribers that subscribe for relatively high levels of service compared to the generally lower levels of service provisioned when accessing as an anonymous or general user. In some examples, one or more of the improved operations of the network device may result in subscriber devices using roaming wireless connections (e.g., using Wi-Fi®) instead of cellular connections to access services of a provider network, which may reduce overall costs for the service provider as costs associated with providing the cellular connections are generally higher than those associated with providing network access via wireless connections. Further, in some instances, roaming wireless connections may provide access to services of the provider network when cellular connections are not accessible, such as, in remote or restricted areas.

In one example, the techniques are directed to a method comprising processing, by a network device, a request, from a subscriber device, via a wireless connection device, for network parameters for accessing one or more services provided by a service provider network, the request for network parameters comprising identifying data associated with a subscriber of the service provider network and outputting, by the network device, to a service server, an authentication request for the subscriber device, the authentication request indicating the identifying data. In response to receiving an authentication reply indicating the authentication request for the subscriber device has been approved and a service profile for the subscriber, the method includes outputting, by the network device, to the wireless connection device, configuration information corresponding to the service profile for the subscriber and outputting, by the network device, to the subscriber device, network parameters for accessing the one or more services provided by the service provider network.

In another example, the techniques are directed to a network device, the network device comprising a memory and one or more processors coupled to the memory. The one or more processors are configured to process, a request, from a subscriber device, via a wireless connection device, for network parameters for accessing one or more services provided by a service provider network, the request for network parameters comprising identifying data associated with a subscriber of the service provider network and output, to a service server, an authentication request for the subscriber device, the authentication request indicating the identifying data. In response to receiving an authentication reply indicating the authentication request for the subscriber device has been approved and a service profile for the subscriber, the one or more processors are configured to output, to the wireless connection device, configuration information corresponding to the service profile for the subscriber and output, to the subscriber device, network parameters for accessing the one or more services provided by the service provider network.

In another example, the techniques are directed to a network system comprising a wireless connection device configured to forward, from a subscriber device, a request for network parameters for accessing one or more services provided by a service provider network, the request for network parameters comprising identifying data associated with a subscriber of the service provider network and a service server configured to authenticate the subscriber device. The network system further comprising a network device including memory and one or more processors coupled with the memory, the one or more processors being configured to process the request for network parameters and output, to the service server, an authentication request for the subscriber device, the authentication request indicating the identifying data. In response to receiving an authentication reply indicating the authentication request for the subscriber device has been approved and a service profile for the subscriber, the one or more processors are configured to output, to the wireless connection device, configuration information corresponding to the service profile for the subscriber, where the wireless connection device is configured to establish a wireless connection with the subscriber device according to the configuration information, and output, to the subscriber device, network parameters for accessing the one or more services provided by the service provider network.

In another examples, the techniques are directed to a method comprising forwarding, by a wireless connection device, from a subscriber device, to a service server, via a network device, a request for accessing one or more services of a service provider network. The request for accessing services of the service provider network specifies a subscriber identifier for a subscriber and a device identifier for the subscriber device. The method further comprises mapping, by the wireless connection device, the device identifier for the subscriber device to the subscriber identifier in an identifying data mapping table. In response to receiving a request for network parameters for accessing the one or more services of the service provider network specifying the device identifier, the method further comprises generating, by the wireless connection device, a modified request for network parameters for accessing the one or more services of the service provider network that indicates the subscriber identifier mapped, by the identifying data mapping table, to the device identifier for the subscriber device. The method further comprises outputting, by the wireless connection device, the modified request to the service server via the network device.

In another examples, the techniques are directed to a wireless connection device comprising memory and one or more processors coupled with the memory. The one or more processors are configured to forward, from a subscriber device, to a service server, via a network device, a request for accessing one or more services of a service provider network, the request for accessing services of the service provider network specifying a subscriber identifier for a subscriber and a device identifier for the subscriber device, map the device identifier for the subscriber device to the subscriber identifier in an identifying data mapping table, in response to receiving a request for network parameters for accessing the one or more services of the service provider network specifying the device identifier, generate a modified request for network parameters for accessing the one or more services of the service provider network that indicates the subscriber identifier mapped, by the identifying data mapping table, to the device identifier for the subscriber device, and output the modified request to the service server via the network device.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
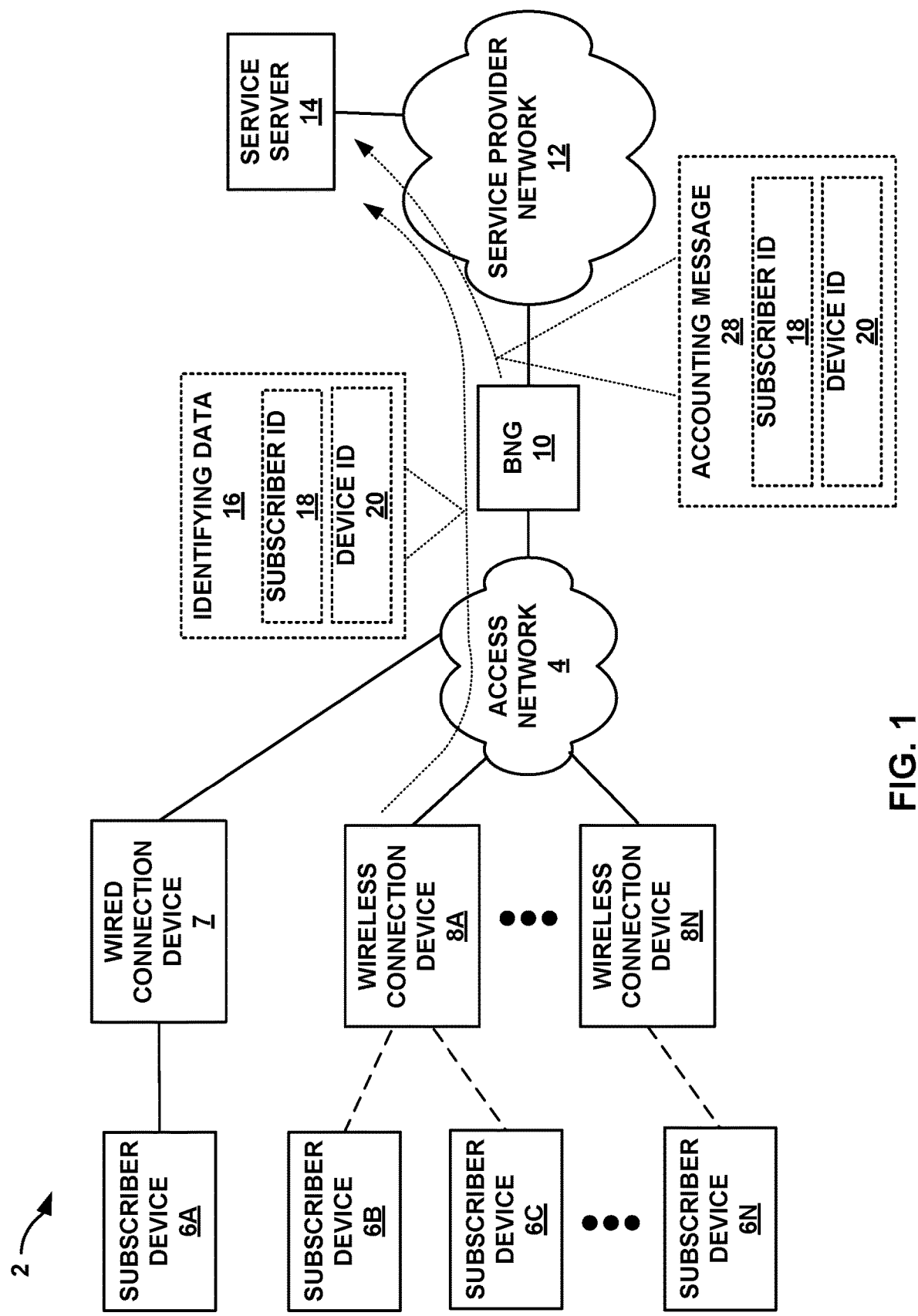
FIG. 1 is a block diagram illustrating a network system having a broadband network gateway (BNG) that supports providing subscribed services in accordance with various aspects of the techniques described in this disclosure.

Generally this disclosure is directed to providing subscribed services (e.g., Internet access) through a roaming wireless broadband connection (e.g., Wi-Fi®) to a "subscriber." As used herein, a subscriber subscribes to broadband and/or mobile services through the service provider (e.g., Internet service provider (ISP)). In some systems that provide a roaming wireless broadband connection (e.g., Wi-Fi) to a subscriber device, a wireless connection device, such as, for example, but not limited to, a wireless access point (WAP), directly allocates an internet protocol (IP) address to a client devices to provide internet access. However, such systems "terminate" a subscriber connection at the wireless connection device, which may hide the subscriber connection from other network devices, such as Broadband Network Gateway (BNG), or an authentication, authorization, and accounting (AAA) server (e.g., Remote Authentication Dial-In User Service (RADIUS) server, diameter server, etc.). That is, information associating a particular subscriber device with a subscriber may not be available to network devices beyond the wireless connection device. As such, network devices beyond the wireless connection device may not configure the wireless connection device to provide a subscribed level of service to the subscriber device. For instance, a particular subscriber associated with the subscriber device may have a relatively high subscribed bandwidth level. However, in this example, the wireless connection device may be configured to assign a default bandwidth level that is less than the subscribed level for the particular subscriber.

Rather than relying on a wireless connection device to directly allocate an IP address to a subscriber device to provide internet access and provide services, which terminates a subscriber connection at the wireless connection device, exemplary systems described herein may instead redirect a subscriber of the subscriber device to a portal which receives user credentials (e.g., a subscriber identifier and password). As such, the wireless connection device may relay a subscriber identifier (e.g., a user name, customer identifier, etc.) to network devices such that the subscriber identifier may be associated by network devices beyond the wireless connection device. In this way, network devices of the service provider may configure the wireless connection device or Broadband Network Gateway to provide a subscribed level of service to the subscriber device. For instance, a first subscriber account associated with a first subscriber device may have a relatively high subscribed bandwidth level and a second subscriber account associated with a second subscriber device may have a relatively low subscribed bandwidth level. In this example, the wireless connection device may be configured to assign a first bandwidth level to the first subscriber device corresponding to the relatedly high subscribed bandwidth level and assign a second bandwidth level to the second subscriber device corresponding to the relatedly low subscribed bandwidth level.

Moreover, in some examples, network devices may track the usage of one or more services of the service provider network. In this example, the network devices may use the association of a particular subscriber device with a subscriber account to monitor the usage of a wireless broadband connection by a subscriber for the subscriber account. In this way, the network provider network may monitor usage of the one or more services of the service provider network via wireless broadband connections.

FIG. 1 is a block diagram illustrating a network system having a broadband network gateway 10 ("BNG 10") that supports providing subscribed services in accordance with various aspects of the techniques described in this disclosure. In this example, network system 2 includes service provider network 12 coupled to access network 4 via a BNG 10.

Service provider network 12 supports one or more packet-based services that are available for request and use by subscriber devices 6A-6N (collectively, "subscriber devices 6"). As examples, service provider network 12 may provide Internet access, bulk data delivery, Voice over Internet Protocol (VoIP), Internet Protocol television (IPTV), Short Messaging Service (SMS), Wireless Application Protocol (WAP) service, Telnet, or customer-specific application services. Service provider network 12 may include, for instance, a local area network (LAN), a wide area network (WAN), the Internet, a virtual LAN (VLAN), an enterprise LAN, a layer 3 virtual private network (VPN), an IP intranet operated by a network service provider that also operates access network 4, an enterprise IP network, or some combination thereof. In various examples, service provider network 12 may be connected to a public WAN, the Internet, or to other networks. Service provider network 12 executes one or more packet data protocols (PDPs), such as IP (IPv4 and/or IPv6), X.25 or Point-to-Point Protocol (PPP), to enable packet-based transport of service provider network 12 services.

An administrator of service provider network 12 (a network service provider) may deploy BNG 10 to function as a gateway to one or more services provided by service provider network 12. Accordingly, BNG 10 is a device or component (e.g., board or service card) implemented within a network device (such as a so-called "router") that provides access to service provider network 12. For example, BNG 10 may represent and/or incorporate a network access server that provides dial-up or virtual private network (VPN) services to an enterprise LAN, a remote access server (e.g., broadband remote access server) or broadband services router that aggregates outputs from one or more access nodes (e.g., Digital Subscriber Line Access Multiplexers (DSLAMs), DSL access, fiber-to-the-home (FTTH) passive optical network (PON), access, etc.) into a higher-speed uplink to service provider network 12, a wireless access point (WAP) providing wireless physical layer access to service provider network 12, or switches that use other LAN-based (e.g., Ethernet) technologies to provide wired physical layer access to service provider network 12. BNG 10 may include one or more service cards that implement a decentralized control plane for subscriber management.

Subscriber devices 6 connect to BNG 10 via access network 4 to receive connectivity to service provider network 12 services (e.g., the Internet) for applications hosted by subscriber devices 6. Each of subscriber devices 6 may represent, for example, a workstation, desktop computer, laptop computer, cellular or other mobile device, Personal Digital Assistant (PDA), gaming console, television set-top box, smart phone, tablet computer, or any other device capable of accessing a computer network via a wireless and/or wired connection. Each of subscriber devices 6 may be associated with a subscriber (e.g., a human). Applications that access services provided by service provider network 12 may alternatively be referred to as "user agents." In this example, any of subscriber devices 6 may connect to BNG 10 in order to access service provider network 12. BNG 10 presents a different control plane IP address to upstream devices such as service server 14.

A network service provider (or other entity that administers service provider network 12) operates or in some cases leases elements of access network 4 to provide packet transport between subscriber devices 6 and BNG 10. Access network 4 may include a broadband access network, cellular access network, a wireless LAN, a public switched telephone network (PSTN), or other type of access network. In examples of network system 2 that include a cellular access network as access network 4, BNG 10 may represent a mobile gateway, for example, a Gateway General Packet Radio Service (GPRS) Serving Node (GGSN), an Access Gateway (aGW), or a Packet Gateway (P-GW). Access network 4 may include a plurality of service virtual LANs (SVLANs) that partition elements of access network (e.g., DSLAMs) into logically different networks. Different subscriber devices 6 may therefore connect to BNG 10 using different SVLANs.

The elements of access network 4 may support any one or more of a variety of protocols, such as IP, Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Using any one or more of these protocols, any of subscriber devices 6 may present authentication credentials to BNG 10 to request access to a service provider network 12 service. For example, subscriber device 6A may send credentials, such as a user name and password, to BNG 10 to request access to a service provided by service provider network 12. Subscriber devices 6 may send credentials using, for instance, a PPP Password Authentication Protocol (PAP) authentication request packet to BNG 10.

BNG 10 is configured by the network service provider (or other administrative entity) as clients (e.g., RADIUS clients) to direct BNG 10 to outsource AAA functions to a specified service server 14, a device that receives and processes connection requests or accounting messages sent by BNG 10 or initiates changes to subscriber authorization after the subscriber has connected. Authentication is the process of verifying a subscriber identity. Authorization is the process of determining whether and the form in which an authenticated subscriber has access to service provider network 12. Accounting is the process of generating records of session statistics and duration for subscribers for billing and monitoring, for example. Examples of service server 14 may include, but are not limited to, a RADIUS server, a diameter server, or another service server.

Service server 14 stores session information in session records for respective subscriber sessions established by BNG 10. Session records include information received from BNG 10 in request messages, such as, for example, but not limited to, RADIUS Accounting-Request and/or Access-Request messages. For example, a session record for a session established by BNG 10 may include a subscriber user name, a BNG-Identifier value that uniquely identifies BNG 10 to service server 14, a BNG 10 network address (e.g., an IPv4 or IPv6 address), an accounting session identifier that uniquely identifies the session on BNG 10 (e.g., "Acct-Session-Id" described in RFC 2866), and accounting information (e.g., input or output octets/packets for the session, timing information).

Wireless connection devices 8A-8N (collectively, "wireless connection devices 8"), also referred to as "wireless access points 8" or simply WAPs 8, may represent wireless hotspots. Wireless connection devices 8 may relay a request. For example, wireless connection devices 8 may relay a request using an authentication protocol to service server 14 for accessing services of service provider network 12. An authentication protocol may include, for example, an extensible authentication protocol (EAP), such as, for instance, extensible authentication protocol tunneled transport layer security (EAP-TTLS). More specifically, for example, the request (e.g., EAP-TTLS) may indicate device identifier 20 (e.g., a Media Access Control (MAC) address). In this example, a subscriber of subscriber device 6B may login to a webpage or an app on subscriber device 6B from where subscriber identifier 18 (e.g., a user name for the subscriber) may be determined by, for example, but not limited to, wireless connection device 8A, service server 14, or another device of network 2. In this way, network 2 may associate device identifier 20 with subscriber identifier 18.

Wireless connection devices 8 may retain (e.g., in a cache) identifying data 16 for subscriber devices 6 from requests. For instance, wireless connection device 8A may retain a mapping of subscriber identifier 18 to device identifier 20 in a cache. Examples of subscriber identifier 18 may include, but are not limited to, a user name, subscriber account number, biometrics corresponding to the subscriber, subscriber phone number, subscriber e-mail, or another indication of a subscriber of one or more services provided by service provider network 12. Examples of device identifier 20 may include, but are not limited to, a MAC address, International Mobile Equipment Identity (IMEI), Mobile Station International Subscriber Directory Number (MSISDN), Integrated Circuit Card Identifier (ICCI), which is also referred to as "SIM ID", or another device identifier.

Wired connection device 7 may represent a Digital Subscriber Line access multiplexer (DSLAM), optical line termination (OLT), a cable modem termination system (CMTS), or another wired connection device. For example, a particular user of subscriber device 6A may access services of service provider network 12 via wired connection device 7. In this example, the particular user of subscriber device 6A may further access services of service provider network 12 via one or more of wireless connection devices 8 using one or more of subscriber devices 6B-6N.

In some systems, network system 2 may effectively "hide" a subscriber presence (e.g., a connection termination) from BNG 10. For example, wireless connection device 8A may output network parameters (e.g., an IP address) for subscriber device 6B without information identifying a subscriber associated with subscriber device 6B. As such, BNG 10 and/or service server 14 may not provide a subscribed level of service to the subscriber.

In accordance with one or more techniques described herein, network system 2 may include identifying data 16 with requests for network parameters for subscriber devices 6 that connect to service provider network 12 via wireless connection devices 8. As used herein, network parameters may include, but are not limited to, an Internet protocol address, domain name system (DNS) server address, a default gateway, or another network parameter. For example, network system 2 may map subscriber identifier 18 to device identifier 20. For instance, wireless connection devices 8 may be configured to store in memory a mapping table that specifies device identifier 20 corresponds to subscriber identifier 18.

For example, a service provider may operate access network 4 to provide different levels of service to subscribers for accessing service provider network 12. The different levels of service may include different amounts of bandwidth per month (e.g., 100 megabytes (MB)/second, 200 MB/second, etc.), different levels of volume of data (1 GB, 10 GB), different levels of throughput (which may be marketed as different amounts of data per second, e.g., 20 megabits per second (Mbps), 40 Mbps, 100 Mbps, etc.), different levels of latency, or a combination of one or more of the foregoing. The different levels of service may be arranged in a large number of ways (and marketed as "service plans") to achieve different goals and serve different types of subscribers (e.g., business customers or residential customers).

More specifically, for example, wireless connection device 8A may output a request (e.g., a RADIUS ACCESS-request) for subscriber device 6B to RADIUS server 14 using EAP-TTLS. In this example, the request indicates subscriber identifier 18, which may be used by network 2 to associate subscriber device 6B with a particular subscriber of service provider network 12.

For example, wireless connection device 8A may be configured to process a request, from subscriber device 6B, for network parameters for accessing one or more services (e.g., the Internet) provided by service provider network 45. The request for network parameters may include identifying data 16 associated with a subscriber of the service provider network 12. In some examples, wireless connection device 8A may map device identifier 20 to subscriber identifier 18. As such, wireless connection device 8A may output the request specifying subscriber identifier 18, which may be used by service server 14 to determine a service profile for subscriber device 6B.

In response to the authentication request, service server 14 may provide a service profile for the subscriber associated with identifying data 16 to BNG 10. In this example, BNG 10 may output, to wireless connection device 8A, configuration information corresponding to the service profile for the subscriber indicated by identifying data 16. For instance, BNG 10 may output, to wireless connection device 8A, configuration information specifying a level of service (e.g., 100 Mbps) corresponding to the service profile for the subscriber indicated by identifying data 16. For instance, the configuration information may specify a subscribed level of service for the subscriber, the subscribed level of service indicating one or more of a level of throughput or a level of latency. In this way, BNG 10 may configure wireless connection device 8A to provide a level of service to subscriber device 6B that corresponds to the service profile for the subscriber associated with identifying data 16.

In response to receiving an authentication reply from service server 14, BNG 10 may output, to wireless connection device 8A, network parameters for accessing the one or more services provided by service provider network 12. For example, BNG 10 may output, to wireless connection devices 8, an IP address for accessing the one or more services provided by service provider network 12.

BNG 10 may generate accounting message 28 to include device identifier 20 and an indication of usage of one or more services of service provider network 12 by device identifier 20. In any case, service server 14 may associate usage of one or more services of service provider network 12 by device identifier 20 as corresponding to a usage by a subscriber associated by subscriber identifier 18. In this way, service server 14 may track a usage by a subscriber associated with subscriber identifier 18 when the subscriber uses subscriber devices 6 to access, via wireless connection devices 8, one or more services provided by service provider network 12. Moreover, BNG 10 and/or service server 14 may provide a subscribed level of service to the subscriber.

BNG 10 may monitor a usage of a subscriber associated with subscriber identifier 18. For example, BNG 10 may associate usage of one or more services of service provider network 12 by device identifier 20 as corresponding to a usage by a subscriber associated by subscriber identifier 18. In this example, BNG 10 may generate accounting message 28 to include subscriber identifier 18 and an indication of usage of one or more services of service provider network 12 by device identifier 20. In this way, service server 14 may track a usage by a subscriber associated with subscriber identifier 18 when the subscriber uses subscriber devices 6 to access, via wireless connection devices 8, one or more services provided by service provider network 12. Moreover, BNG 10 and/or service server 14 may provide a subscribed level of service to the subscriber. Although this example described using subscriber device 6B and wireless connection device 8A, some examples may use other subscriber devices (e.g., subscriber devices 6C-6N) and/or other wireless connections devices (e.g., wireless connection devices 8B-8N).

Figure 2:
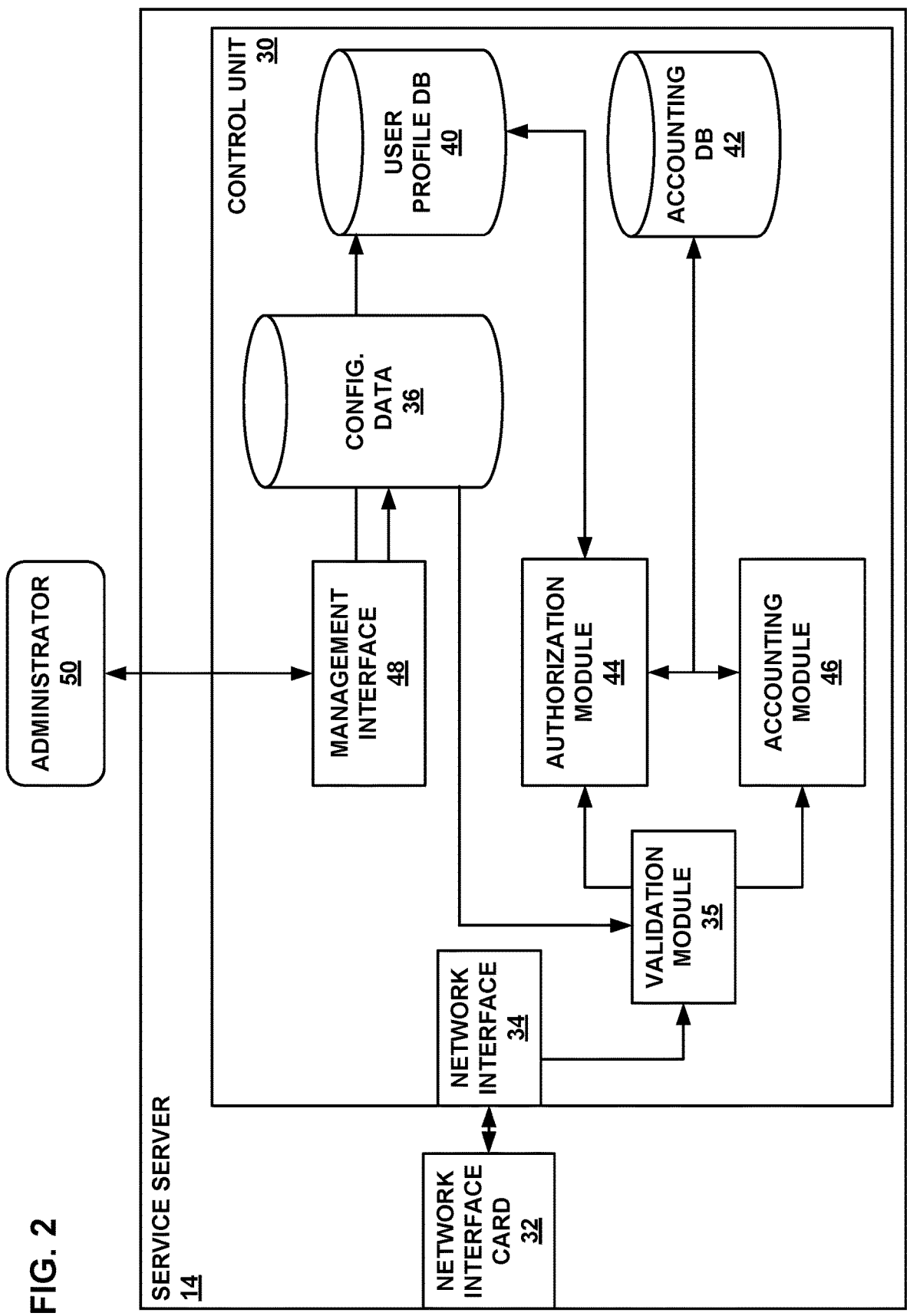
FIG. 2 illustrates, in detail, an example RADIUS server that supports providing subscribed services in roaming wireless broadband networks in accordance with various aspects of the techniques described in this disclosure.

FIG. 2 illustrates, in detail, an example service server 14 that supports providing subscribed services in roaming wireless broadband networks in accordance with various aspects of the techniques described in this disclosure. Service server 14 includes control unit 30 and network interface card 32. Operation of service server 14 is described in the context of network system 2 of FIG. 1. Although service server 14 is described herein as a RADIUS server, service server 14 may include other types of service servers, for example, a diameter server.

Control unit 30 of service server 14 provides an operating environment for executing modules, which in the illustrated example include network interface 34, validation module 35, authorization module 44, accounting module 46, and management interface 48. Control unit 30 may include one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. In this example, control unit 30 also includes computer-readable storage media to store configuration data 36, user profile database 40 (illustrated as "user profile DB 40"), and accounting database 42 (illustrated as "accounting DB 42") data structures, which may include flat files, databases, tables, trees, and/or lists, for example.

Administrator 50 represents a network service provider entity (e.g., a human or software agent) that invokes management interface 48 to configure service server 14 with configuration data of configuration data 36 and user profiles of user profile database 40. Management interface 48 may present a front-end interface, such as a web-based or other graphical user interface (GUI) or a command-line interface (CLI), to allow administrator 50 to enter configuration data. Management interface 48 may present an LDAP configuration interface for configuring and retrieving user profiles from user profile database 40. Management interface 48 may also execute Simple Network Management Protocol to enable monitoring and configuration by administrator 50.

Administrator 50 invokes management interface 48 to add RADIUS client information to configuration data 36 for each client of service server 14, such as each of BNG 10 of FIG. 1. RADIUS client information for any of BNG 10 may include the BNG network address and a RADIUS shared secret used to validate communications between service server 14 and BNG 10.

User profile database 40 stores user profiles for subscribers. A user profile may include a corresponding subscriber identifier (e.g., a user name) and password and/or other authentication credentials, as well as the subscriber's authorization and/or connection parameters. In some examples, user profile database 40 is a remote database to which service server 14 issues authentication and authorization requests to receive an authentication indication (e.g., accept or reject) as well as authorization and/or connection parameters.

Accounting database 42 stores subscriber accounting information for service server 14 operating as a RADIUS accounting server. Accounting database 42 may include an SQL database. In some examples, accounting database 42 is a remote database to which service server 14 issues queries to add or modify subscriber accounting information.

Network interface card 32 exchanges network packets that carry RADIUS protocol messages with BNG 10 connected to network interface card 32 by network links. Network interface card 32 exchanges network packets with network interface 34 of control unit 30. User Datagram Protocol (UDP) datagrams carry RADIUS protocol messages. Network interface 34 implements a network stack to receive UDP messages sent to a port assigned to RADIUS and provides application data in the form of RADIUS protocol request packets to authorization module 44 and accounting module 46 for processing after a validation of the RADIUS protocol messages by validation module 35. Similarly, network interface 34 uses the network stack to encapsulate RADIUS reply packets in UDP datagrams for output by network interface card 32 to BNG 10.

Example RADIUS protocol request packets include Access-Request messages sent by a RADIUS client to request authentication and authorization for a subscriber connection and Accounting-Request messages sent by a RADIUS client to specify accounting information for a subscriber connection that has been established by the RADIUS client. Network interface 34 provides each RADIUS protocol request packet to validation module 35, which performs RADIUS client validation of the packet by confirming that the request authenticator included therein specifies the shared secret for the source network address of the RADIUS protocol request message. If RADIUS client validation fails, the packet is silently ignored/dropped. Upon successful RADIUS client validation, validation module 35 passes the RADIUS protocol request message to authorization module 44 (in the case of an Access-Request message) or to accounting module 46 (in the case of an Accounting-Request message).

Authorization module 44 processes an Access-Request message from BNG 10 by querying user profile database 40 to obtain credentials for the subscriber requesting access and attempting to validate the subscriber against the credentials. If authorization fails, authorization module 44 returns an Access-Reject message to BNG 10. If authorization is successful, authorization module 44 returns an Access-Accept message.

In accordance with the described techniques, service server 14 receives an authentication request for a subscriber device. In some examples, the authentication request indicates identifying data 16. For example, network interface 34 may receive an authentication request for subscriber device 6B that indicates subscriber identifier 18. In this example, authorization module 44 authorizes the request. Accounting module 46 access a service profile associated with the subscriber identifier in user profile database 40. In this example, network interface 34 outputs an authentication reply indicating the authentication request for the subscriber device has been approved and a service profile for the subscriber that corresponds to subscriber identifier 18.

Service server 14 may receive an authentication request for subscriber device 6B that indicates a device identifier (e.g., MAC address, SIM identifier, IMEI, MSISDN, etc.). For example, network interface 34 may receive an authentication request for subscriber device 6B that indicates device identifier 20. In this example, authorization module 44 authorizes the request. Accounting module 46 access a service profile associated with device identifier 20. In this example, network interface 34 outputs an authentication reply indicating the authentication request for the subscriber device has been approved and a service profile for the subscriber. In some examples, accounting module 46 accumulates all the accounting packets for a subscriber together, irrespective of device identifier 20, based on subscriber identifier 18.

Figure 3:
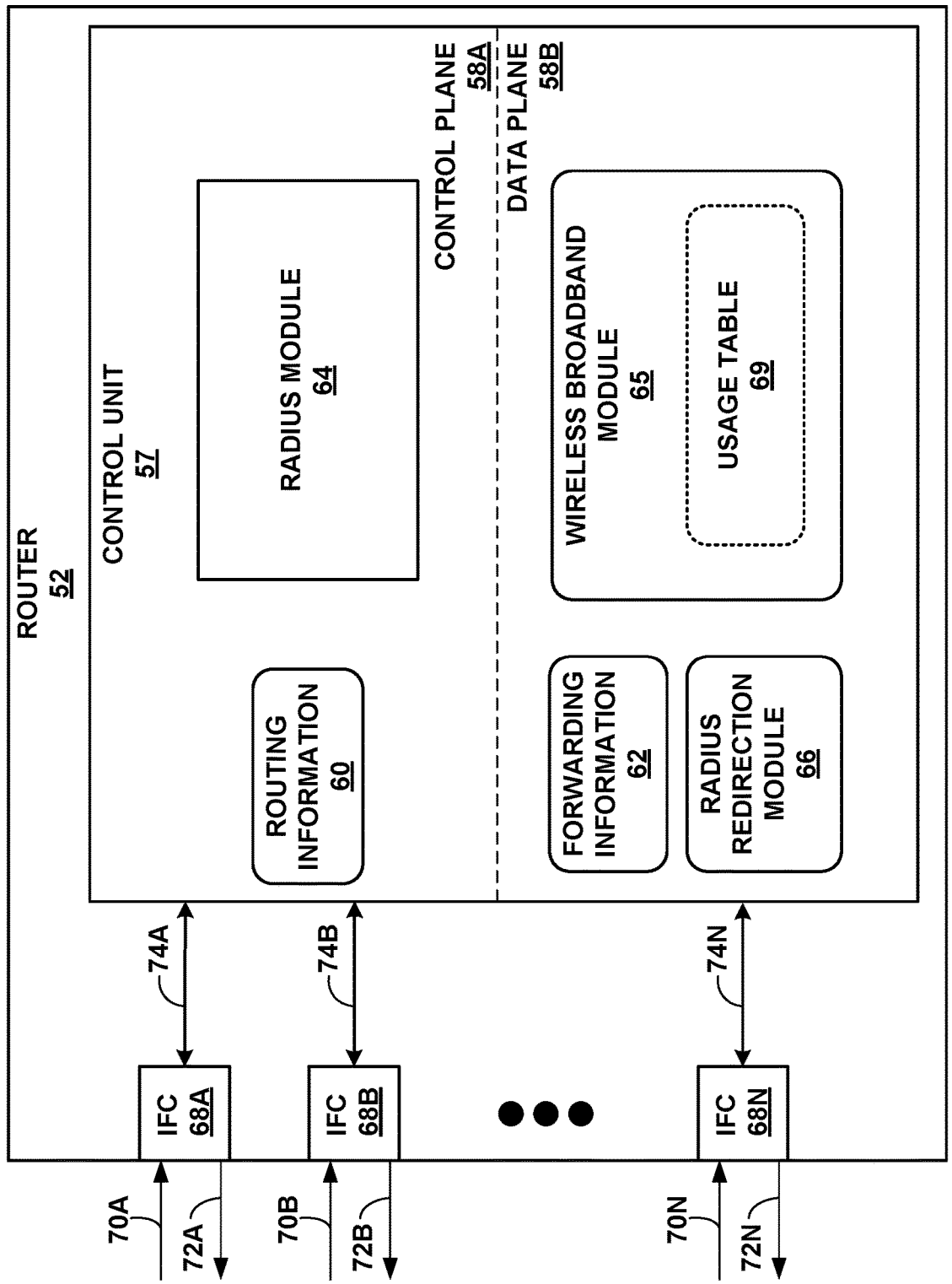
FIG. 3 illustrates, in detail, an example router acting as a RADIUS client that supports providing subscribed services in roaming wireless broadband networks in accordance with various aspects of the techniques described in this disclosure.

FIG. 3 illustrates, in detail, an example network access server acting as a RADIUS client that supports providing subscribed services in roaming wireless broadband networks in accordance with various aspects of the techniques described in this disclosure. Router 52 may represent one example of BNG 10 shown in the example of FIG. 1. Router 52 may represent any network device that performs routing functions to route data units through a network. Router 52 may route particular types of data units referred to as packets and as a result may be referred to as a "packet-based router."

Moreover, router 52 may implement layer 3 (L3) protocols or network layer protocols (where L3 refers to the L3 of the open system interconnection (OSI) model), such as an IP, and route packets according to layer 3 information. Consequently, router 52 may also be referred to as a "layer 3 router", a "network layer router," or an "IP router."

Additionally, router 52 may represent an example of a broadband network gateway (BNG), which may also be referred to as a broadband remote access server (BRAS). Acting as BNG 10, router 52 may aggregate user sessions from access network 4, and perform policy management and IP quality of service (QoS) with respect to the user sessions.

As shown in FIG. 3, router 52 includes a control unit 57. Control unit 57 may comprise one or more processors (not shown in FIG. 3) that execute software instructions, such as those used to define a software or computer program, stored to a computer-readable storage medium (again, not shown in FIG. 3), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Control unit 57 may also include, either as an alternative to the one or more processors or in addition to the one or more processors, dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 57 may be divided into two logical or physical "planes" to include a first control or routing plane 58A and a second data or forwarding plane 58B. That is, control unit 57 may implement two separate functionalities, e.g., the routing and forwarding functionalities, either logically, e.g., as separate software instances executing on the same set of hardware components, or physically, e.g., as separate physical dedicated hardware components (which may be referred to as "packet forwarding engines," abbreviated as "PFEs") that either statically implement the functionality in hardware or dynamically execute software or a computer program to implement the functionality.

Control plane 58A of control unit 57 may execute the routing functionality of router 52. In this respect, control plane 58A may represent hardware and/or software of control unit 57 that implements routing protocols (not shown in FIG. 3) by which routing information 60 may be determined. Routing information 60 may include information defining a topology of a network, such as service provider network 12. Control plane 58A may resolve the topology defined by routing information 60 to select or determine one or more routes through service provider network 12. Control plane 58A may then update data plane 58B with these routes, where data plane 58B maintains these routes as forwarding information 62. Forwarding or data plane 58B may represent hardware (e.g., the above noted PFEs) and/or software of control unit 57 that forwards network traffic in accordance with forwarding information 62.

Control plane 58A may further comprise a RADIUS module 64 that implements the RADIUS protocol in the manner described above with respect to BNG 10 of FIG. 1. In other words, RADIUS module 64 may interface with service server 14 on behalf of subscriber devices 6 in order to authenticate, authorize, and account.

Data plane 58B may comprise a RADIUS redirection module 66. RADIUS redirection module 66 may represent a software and/or hardware module that inspects incoming network traffic to determine if this incoming network traffic represents RADIUS messages. RADIUS redirection module 66 may, in some instances, comprise a logic programmed within a forwarding ASIC (representative of PFEs) or other component of data plane 58B that filters traffic based on headers of the incoming network traffic or any other similar mechanism that data plane 58B may employ to distinguish particular types of network traffic from other types of network traffic.

As further shown in FIG. 3, router 52 includes Interface Cards (IFCs) 68A-68N ("IFCs 68") that receive and send packet flows or network traffic via inbound network links 70A-70N ("inbound network links 70") and outbound network links 72A-72N ("outbound network links 72"), respectively. IFCs 68 are typically coupled to network links 70, 72 via a number of interface ports (not shown), and forward and receive packets and control information from control unit 57 via a respective one of paths 74A-74N ("paths 74"). Each physical interface of IFCs 68 is typically assigned a unique identifier by control unit 57, and multiple logical interfaces having unique identifiers may be assigned to each physical interface, where each logical interface represents as a distinct input or output interface for different network traffic. These logical interfaces may represent VLANs and each VLAN may be assigned a unique VLAN tag.

Router 52 may include a chassis (not shown in FIG. 3) having a number of slots for receiving a set of cards, including IFCs 68. Each card may be inserted into a corresponding slot of a chassis for communicably coupling the card to a control unit 57 via a bus, backplane, or other electrical communication mechanism.

In accordance with the techniques described in this disclosure, wireless broadband module 65 may process a request, from subscriber device 6B, via wireless connection device 8A, for network parameters for accessing one or more services provided by service provider network 12. The request for network parameters comprising identifying data 16 associated with a subscriber of the service provider network 12. For example, subscriber device 6B may output, via router 52, to service server 14 a request for network parameters comprises a Dynamic Host Configuration Protocol (DHCP) Discover or DHCPv6 Solicit packet indicating the identifying data. Again, the request (e.g., DHCP Discover, DHCPv6 Solicit, etc.) may indicate subscriber identifier 18. In some example, data plane 58B outputs, to service server 14, an authentication request for subscriber device 6B that indicates device identifier 20, which may include subscriber identifier 18 that was received in the request for network parameters.

In response to receiving an authentication reply indicating the authentication request for subscriber device 6B has been approved and a service profile for the subscriber, wireless broadband module 65 may output, to wireless connection device 8A, configuration information corresponding to the service profile for the subscriber. In this example, wireless broadband module 65 outputs, to subscriber device 6B, network parameters for accessing the one or more services provided by the service provider network. For example, wireless broadband module 65 outputs, to subscriber device 6B, outputs an IP address for connecting with wireless connection device 8A using a roaming wireless broadband connection (e.g., Wi-Fi®).

In some examples, wireless broadband module 65 may monitor a usage of one or more services by a subscriber device. For example, wireless broadband module 65 may store an entry in usage table 69 indicating a throughput of data transferred between subscriber device 6B and service provider network 12. Wireless broadband module 65 may generate an accounting message indicating identifying data 16 and usage of the one or more services by the subscriber device. For example, wireless broadband module 65 may generate an accounting message indicating identifying data 16 and a usage of the one or more services by subscriber device 6B using the entry in usage table 69.

Figure 4:
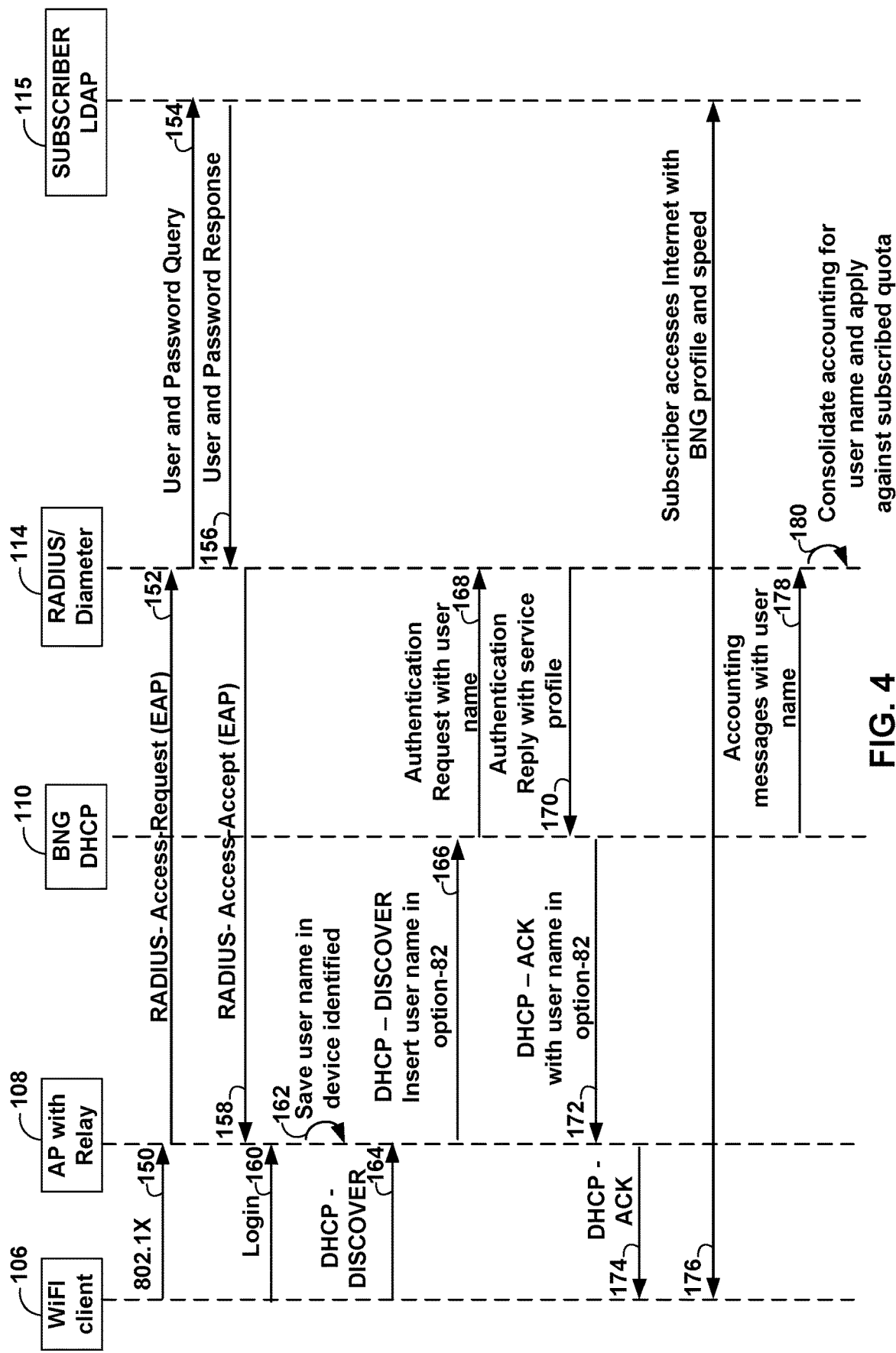
FIG. 4 is a conceptual diagram illustrating an example process for providing subscribed services in roaming wireless broadband networks in accordance with various aspects of the techniques described in this disclosure.

FIG. 4 is a conceptual diagram illustrating an example process for providing subscribed services in roaming wireless broadband networks in accordance with various aspects of the techniques described in this disclosure. Wi-Fi® client 106 is an example of subscriber devices 6B-6N. Access point (AP) 108 is an example of wireless connection devices 8. BNG 110 is an example of BNG 10. RADIUS server 114 (illustrated as "RADIUS/Diameter server") is an example of service server 14.

Initially, Wi-Fi® client 106 connects with AP 108 (e.g., a Wi-Fi® hotspot) via a wireless protocol (150). As shown, Wi-Fi® client 106 may connect with AP 108 using a port-based network access control, such as IEEE 802.1X. The Wi-Fi® client 106 authenticates with the Wi-Fi® hotspot using a software application executing at Wi-Fi® client 106, or a uniform resource locator (URL), or another out-of-band mechanism. For example, Wi-Fi® client 106 may output, via AP 108 and BNG 110, a RADIUS-access-request to RADIUS server 114 using an authentication protocol (152). For instance, Wi-Fi® client 106 outputs, via AP 108 and BNG 110, the RADIUS-access-request to AP 108 using EAP-TTLS. In this example, AP 108 relays the request to BNG 110 using EAP-TTLS, which relays the request to RADIUS server 114 using EAP-TTLS.

RADIUS server 114 outputs a username and password query to a subscriber (lightweight directory access protocol) LDAP 115 (154). In some examples, subscriber LDAP 115 may be executed at RADIUS server 114. In any case, subscriber LDAP 115 outputs a user and password response to RADIUS server 114 (156). In response to the user and password response, RADIUS server 114 outputs a RADIUS-access-accept message (158). As shown, BNG 110 relays the RADIUS-access-accept message from RADIUS server 114 to AP 108.

Wi-Fi® client 106 outputs login information (e.g., a subscriber identifier and password) to AP 108 (160). In this example, AP 108 stores a device identifier (e.g., MAC address, SIM identifier, IMEI, MSISDN, etc.) mapped to a subscriber identifier (e.g., user name, customer identifier, etc.) (162). In some examples, the mapping of the device identifier to the subscriber identifier is retained in a memory of AP 108 for limited time, such as, for example, 30 seconds. Again, in some examples, the mapping of the device identifier to the subscriber identifier may be performed by BNG 110, RADIUS server 114, or another network device.

After a successful authentication by AP 108, Wi-Fi® client 106 may output a DHCP DISCOVER or DHCPv6 SOLICIT packet (164). A relay in AP 108 may look for an existing mapping and determine a subscriber identifier specified in the existing mapping. In this example, the subscriber identifier is a user name, however, in other examples, the subscriber identifier may be different, for example, a customer number. AP 108 inserts the user name into a DHCP discover packet and outputs the DHCP discover packet with the user name, in this example option-82 before relaying it to the DHCP relay/server on BNG 110 (166). Option-82 may refer to a DHCP relay agent information option that provides information about a network location of a DHCP client.

When a DHCP relay/server (e.g., wireless broadband module 65) on BNG 110 receives the DHCP packet with the user name, BNG 110 creates the user name of the subscriber from the above field (e.g. option-82). In this example, BNG 110 passes the user name to RADIUS server 114 during the authentication phase (168). In response, RADIUS server 114 outputs a service profile as per the home subscription of the subscriber's connection plan (170). BNG 110 outputs a DHCP acknowledgement with a user name in option-82 (172). For example, BNG 110 outputs configuration information corresponding to the service profile for the subscriber. AP 108 configures a connection with Wi-Fi® client according to the configuration information and outputs a DHCP acknowledgement to Wi-Fi® client 106 (174). Wi- Fi® client 106 may access one or more services (e.g., the Internet) of service provider network 12 according to the service profile (e.g., subscribed bandwidth, latency, etc.) (176).

BNG 110 may output accounting message indicating the identifying data and the usage of the one or more services by the subscriber device (178). For example, BNG 110 may output an accounting message indicating a bandwidth usage of Wi-Fi® client 106 with a user name. In this way, accounting servers may combine all the accounting messages in a backend keyed based on the identifying data and consolidate against the subscribers' purchased quota.

Figure 5:
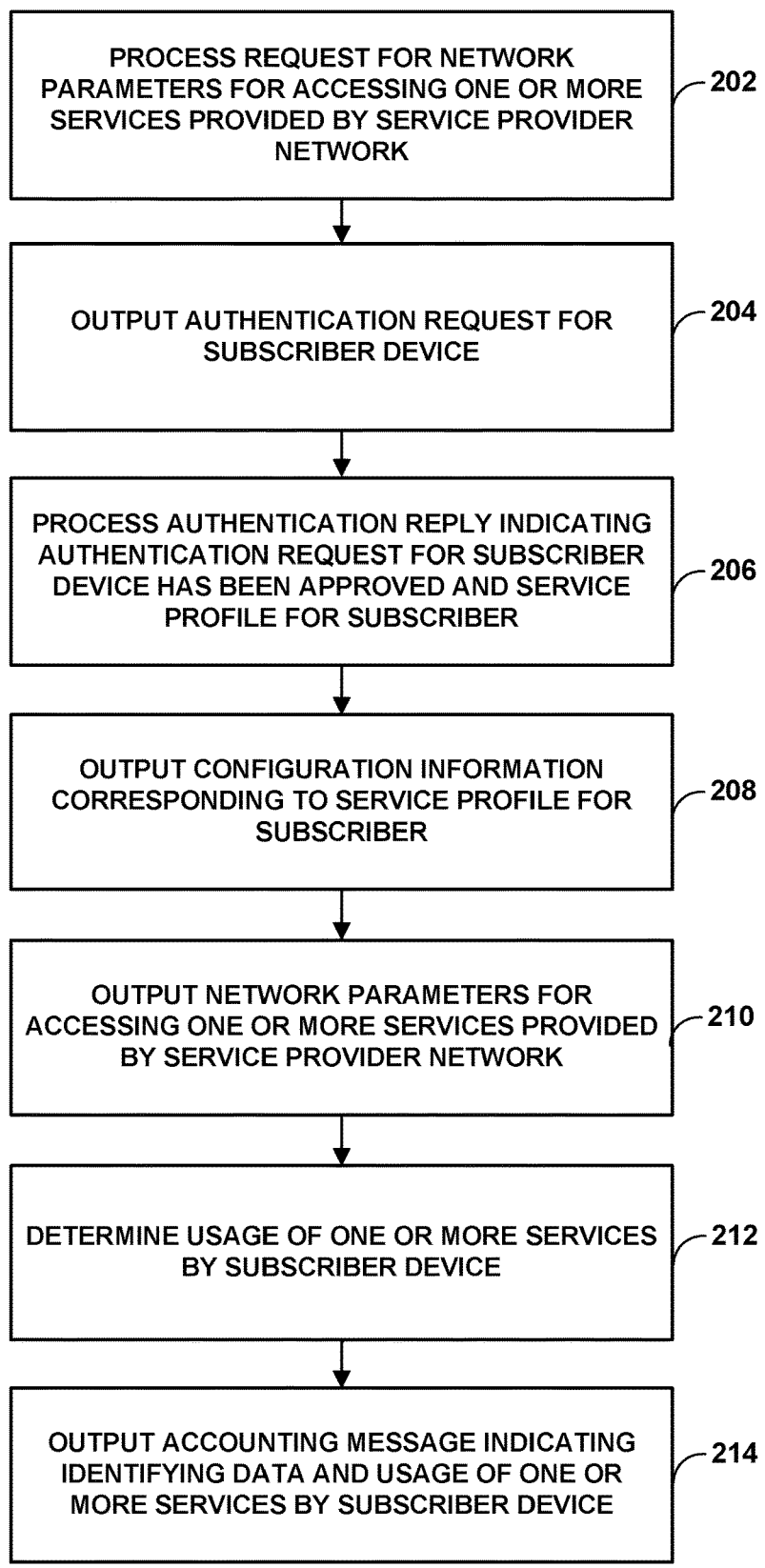
FIG. 5 is a flowchart illustrating an example of providing subscribed services in roaming wireless broadband networks in accordance with various aspects of the techniques described in this disclosure.

FIG. 5 is a flowchart illustrating an example of providing subscribed services in roaming wireless broadband networks in accordance with various aspects of the techniques described in this disclosure. Although the following described an example using subscriber device 6B and wireless connection device 8A, other examples may use other subscriber devices 6 and/or other wireless connection devices 8.

Initially, wireless broadband module 65 forwards a request for network parameters for accessing one or more services (e.g., the Internet) provided by service provider network 12 (202). For example, wireless broadband module 65 processes a DHCP discover or DHCPv6 solicit message with subscriber identifier 18 (e.g., a user name). In this example, wireless broadband module 65 may determine subscriber identifier 18 using the request for network parameters as described further in FIG. 6.

Wireless broadband module 65 outputs an authentication request for subscriber device 6B (204). For example, wireless broadband module 65 outputs an authentication request for subscriber device 6B that indicates subscriber identifier 18.

Wireless broadband module 65 processes an authentication reply indicating an authentication request for subscriber device 6B has been approved and a service profile for the subscriber (206). Wireless broadband module 65 outputs configuration information corresponding to a service profile for the subscriber (208). For example, wireless broadband module 65 outputs configuration information corresponding to a service profile for the subscriber that configured wireless connection device 8A for a subscribed level (e.g., a latency and/or bandwidth) specified by the service profile. Wireless broadband module 65 outputs network parameters for accessing one or more services provided by service provider network 12 (210). For example, wireless broadband module 65 outputs an IP address to subscriber device 6B for accessing service provider network 12 via wireless connection device 8A using a roaming wireless connection (e.g., Wi-Fi®).

Wireless broadband module 65 determines a usage of one or more services by subscriber device 6B (212). For example, wireless broadband module 65 determines a usage of one or more services by subscriber device 6B using usage table 69. Wireless broadband module 65 outputs an accounting message including subscriber identifier 18 and the usage of one or more services by subscriber device 6B (214). Service server 114 consolidates accounting for services used by all the devices based on the same subscriber identifying data 18.

Figure 6:
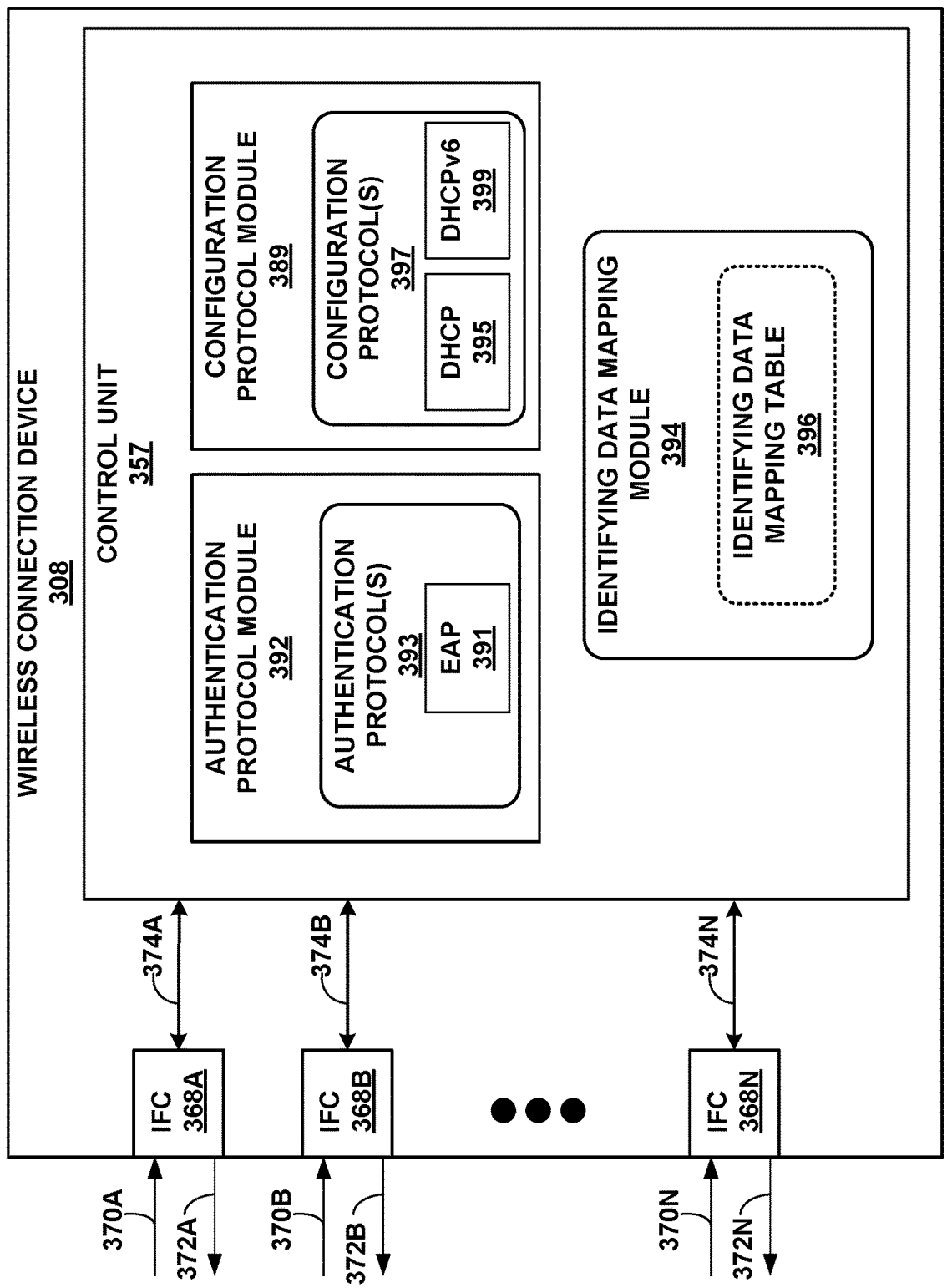
FIG. 6 illustrates, in detail, an example wireless connection device in accordance with various aspects of the techniques described in this disclosure.

FIG. 6 illustrates, in detail, an example wireless connection device 308 in accordance with various aspects of the techniques described in this disclosure. Wireless connection device 308 may represent one example of wireless connection device 8A shown in the example of FIG. 1. Wireless connection device 308 may route particular types of data units referred to as packets and as a result may be referred to as a "packet-based router."

Wireless connection device 308 includes a control unit 357. Control unit 357 may comprise one or more processors (not shown in FIG. 6) that execute software instructions, such as those used to define a software or computer program, stored to a computer-readable storage medium (again, not shown in FIG. 6), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Control unit 357 may also include, either as an alternative to the one or more processors or in addition to the one or more processors, dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Wireless connection device 308 may include authentication protocol module 392, configuration protocol module 389, and identifying data mapping module 394. Authentication protocol module 392 may relay a request using authentication protocol(s) 393 to service server 14 for accessing services of service provider network 12. As shown, one or more authentication protocols 393 may include, for example, but not limited to, an extensible authentication protocol (EAP) 391, such as, for instance, extensible authentication protocol tunneled transport layer security (EAP-TTLS), or another authentication protocol. In this example, a subscriber of subscriber device 6B may login to a webpage or an application on subscriber device 6B from where subscriber identifier 18 (e.g., a user name for the subscriber) may be determined by wireless connection device 308.

Identifying data mapping module 394 may retain (e.g., in a cache) identifying data 16 for subscriber devices 6 from requests. For instance, identifying data mapping module 394 may retain a mapping of subscriber identifier 18 to device identifier 20 in identifying mapping table 396. Again, examples of subscriber identifier 18 may include, but are not limited to, a user name, subscriber account number, biometrics corresponding to the subscriber, subscriber phone number, subscriber e-mail, or another indication of a subscriber of one or more services provided by service provider network 12. Examples of device identifier 20 may include, but are not limited to, a MAC address, International Mobile Equipment Identity (IMEI), Mobile Station International Subscriber Directory Number (MSISDN), Integrated Circuit Card Identifier (ICCI), which is also referred to as "SIM ID", or another device identifier.

Configuration protocol module 389 may support one or more configuration protocols 397. As shown, one or more configuration protocols 397 may include, for example, but not limited to, Dynamic Host Configuration Protocol (DHCP) Discover 395, DHCPv6 Solicit 399, or another configuration protocol. Configuration protocol module 389 may relay modified requests (e.g., DHCP Discover, DHCPv6 Solicit) that specify a subscriber identifier using identifying data mapping table 396. For example, subscriber device 6B generates the request and configuration protocol module 389 relays the modified request.

As further shown in FIG. 6, wireless connection device 308 includes Interface Cards (IFCs) 368A-368N ("IFCs 368") that receive and send packet flows or network traffic via inbound network links 370A-370N ("inbound network links 370") and outbound network links 372A-372N ("outbound network links 372"), respectively. IFCs 368 are typically coupled to network links 370, 372 via a number of interface ports (not shown), and forward and receive packets and control information from control unit 357 via a respective one of paths 374A-374N ("paths 374"). Each physical interface of IFCs 368 is typically assigned a unique identifier by control unit 357, and multiple logical interfaces having unique identifiers may be assigned to each physical interface, where each logical interface represents as a distinct input or output interface for different network traffic.

In accordance with the techniques described in this disclosure, authentication protocol module 392 may forward, from subscriber device 6B, to service server 14, via BNG 10, a request for accessing one or more services of service provider network 14. In this example, the request for accessing services of the service provider network specifies subscriber identifier 18 for a subscriber and device identifier 20 for the subscriber device 6B. Identifying data mapping module 394 maps device identifier 20 for the subscriber device to subscriber identifier 18 in identifying data mapping table 396.

In response to receiving a request for network parameters for accessing the one or more services of the service provider network from subscriber device 6B, configuration protocol module 389 generates a modified request for network parameters for accessing the one or more services of service provider network 12 that indicates subscriber identifier 18 mapped, by the identifying data mapping table 396, to the device identifier for the subscriber device.

For example, configuration protocol module 389 may receive, from subscriber device 6B, a Dynamic Host Configuration Protocol (DHCP) Discover or DHCPv6 Solicit packet. Again, configuration protocol module 389 may generate the modified request (e.g., DHCP Discover, DHCPv6 Solicit, etc.) to indicate the subscriber identifier 18. Configuration protocol module 389 outputs the modified request to service server 14 via BNG 10. For example, authentication protocol module 392 outputs the modified request to service server 14 via BNG 10 as an option-82 in a DHCP discover request.

Configuration protocol module 389 receives, after outputting the modified request, from BNG 10, configuration information corresponding to a service profile for the subscriber. For example, the configuration information may indicate one or more of a subscribed bandwidth, a subscribed latency, or other subscribed values. Configuration protocol module 389 may configure the wireless connection device to establish a wireless connection with the subscriber device based on the configuration information. For example, configuration protocol module 389 may configure the wireless connection with the subscribed bandwidth. Additionally, or alternatively, the configuration information may configure the wireless connection with the subscribed latency. Configuration protocol module 389 may forward, from BNG 10, to subscriber device 6B, network parameters for accessing the one or more services provided by the service provider network. For example, configuration protocol module 389 outputs, to subscriber device 6B, an IP address for connecting with wireless connection device 8A using a roaming wireless broadband connection (e.g., Wi-Fi®).

Figure 7:
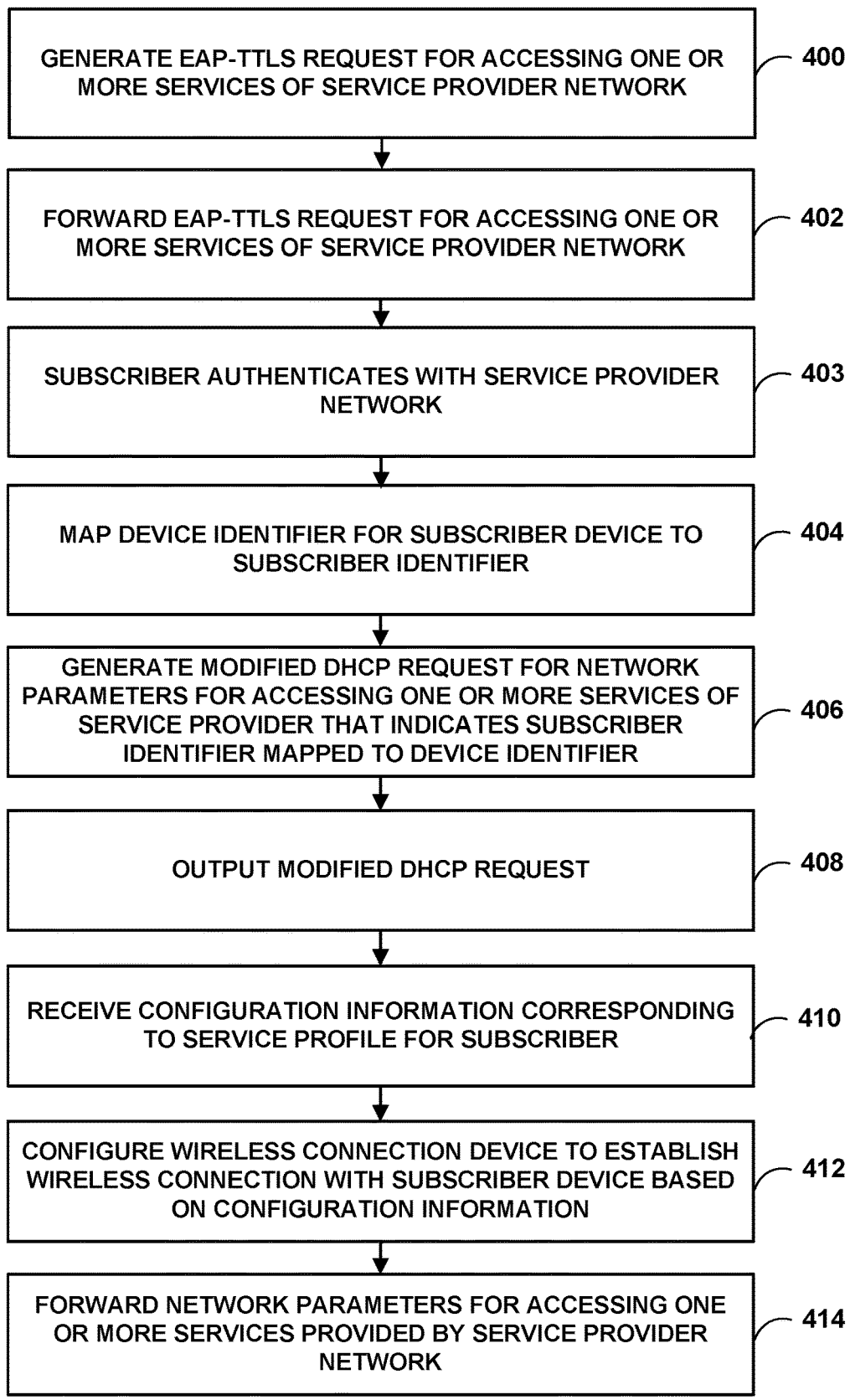
FIG. 7 is a flowchart illustrating an example of a wireless connection device providing subscribed services in roaming wireless broadband networks in accordance with various aspects of the techniques described in this disclosure.

FIG. 7 is a flowchart illustrating an example of a wireless connection device providing subscribed services in roaming wireless broadband networks in accordance with various aspects of the techniques described in this disclosure.

Although the following described an example using subscriber device 6B and wireless connection device 308 as an example of wireless connection device 8A, other examples may use other subscriber devices 6 and/or other wireless connection devices 8.

Initially, subscriber device 6B generates an EAP-TTLS request for accessing one or more services of service provider network 12 (400). Although FIG. 7 illustrates the request for accessing one or more services of service provider network 12 as an EAP-TTLS request, in some examples, the request for accessing one or more services of service provider network 12 may use another authentication protocol for accessing services of service provider network 12. Authentication protocol module 392 forwards, from subscriber device 6B, to service server 14, via BNG 10 or another network device, the EAP-TTLS request for accessing one or more services of service provider network 12 (402).

Subscriber device 6B authenticates with service provider network 12 (403). For example, a subscriber may cause subscriber device 6B to authenticate out-of-band by, for example, but not limited to, logging into an internet service provider (ISP) (e.g., broadband service provider) using a software application, a web link (e.g., URL), or another out-of-band mechanism. Identifying data mapping module 394 maps device identifier 20 for subscriber device 6B to subscriber identifier 18 in identifying data mapping table 396 (404). For example, identifying data mapping module 394 maps device identifier 20 for subscriber device 6B to subscriber identifier 18 in identifying data mapping table 396 using login information from when subscriber device 6B authenticates with service provider network 12.

In response to receiving a DHCP request for network parameters for accessing the one or more services of service provider network 12 specifying device identifier 20 (e.g., from subscriber device 6B), configuration protocol module 389 generates a modified DHCP request for network parameters for accessing the one or more services of service provider network 12 that indicates subscriber identifier 18 mapped, by the identifying data mapping table 396, to device identifier 20 for the subscriber device (406). For example, subscriber device 6B generates a DHCP request for network parameters for accessing the one or more services of service provider network 12 specifying device identifier 20 (e.g., from subscriber device 6B) and configuration protocol module 389 generates a modified DHCP request that specifies the subscriber identifier 18 mapped, by the identifying data mapping table 396, to device identifier 20 for the subscriber device in option-82. Although FIG. 7 illustrates the request for network parameters for accessing the one or more services of service provider network 12 as a DHCP request, in some examples, the request for accessing one or more services of service provider network 12 may use another configuration protocol for accessing services of service provider network 12, such as, for example, but not limited to, DHCPv6.

Configuration protocol module 389 outputs the modified DHCP request to service server 14 via BNG 10 (408). Although FIG. 7 describes the modified DHCP request being output to service server 14 via BNG 10, in some examples, the modified DHCP request being output to service server 14 may be output via another network device. Configuration protocol module 389 receives, after outputting the modified DHCP request, from BNG 10, configuration information corresponding to a service profile for the subscriber (410).

Configuration protocol module 389 configures wireless connection device 308 to establish, modify, and/or re-establish a wireless connection with subscriber device 6B based on the configuration information (412). Configuration protocol module 389 forwards, from BNG 10, to subscriber device 6B, network parameters for accessing the one or more services provided by service provider network 12 (414).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
processing, by a network device, a request, from a subscriber device, via a wireless connection device, for network parameters for accessing one or more services provided by a service provider network, the request for network parameters comprising identifying data associated with a subscriber of the service provider network;
outputting, by the network device, to a service server, an authentication request for the subscriber device, the authentication request indicating the identifying data;
in response to receiving an authentication reply indicating the authentication request for the subscriber device has been approved and a service profile for the subscriber:
outputting, by the network device, to the wireless connection device, configuration information corresponding to the service profile for the subscriber; and
outputting, by the network device, to the subscriber device, network parameters for accessing the one or more services provided by the service provider network; and
in response to determining, by the network device, a bandwidth usage of the one or more services by the subscriber device, outputting, by the network device, to the service server, an accounting message indicating the identifying data and the bandwidth usage of the one or more services by the subscriber device.

2. The method of claim 1, wherein the identifying data of the request for network parameters comprises a subscriber identifier indicating the subscriber and wherein outputting the authentication request comprises outputting the authentication request to indicate the subscriber identifier.

3. The method of claim 2, wherein the subscriber identifier comprises one or more of a user name, a user identifier, biometrics corresponding to the subscriber, or customer number.

4. The method of claim 1, wherein the identifying data of the request for network parameters comprises a device identifier indicating the subscriber device.

5. The method of claim 4, wherein outputting the authentication request comprises outputting the authentication request to indicate the device identifier.

6. The method of claim 4, further comprises:
determining a subscriber identifier based on the device identifier, wherein outputting the authentication request comprises outputting the authentication request to indicate the subscriber identifier.

7. The method of claim 4, wherein the device identifier comprises one or more of a media access control (MAC) address, International Mobile Equipment Identity (IMEI), Mobile Station International Subscriber Directory Number (MSISDN), or subscriber identification module (SIM) identifier.

8. The method of claim 1, wherein the wireless connection device determines a subscriber identifier indicating the subscriber based on a subscriber login by the subscriber using a software application or a Uniform Resource Locator (URL), wherein the wireless connection device maps a device identifier indicating the subscriber device to the subscriber identifier, and wherein the wireless connection device generates the request for network parameters to indicate the subscriber identifier.

9. The method of claim 1, wherein the configuration information specifies a subscribed level of service for the subscriber, the subscribed level of service indicating one or more of a level of throughput or a level of latency.

10. The method of claim 1, wherein the network parameters comprise an Internet protocol address, domain name system (DNS) server address, or a default gateway.

11. The method of claim 1, wherein the request for network parameters comprises a Dynamic Host Configuration Protocol (DHCP) discover or DHCPv6 solicit packet indicating the identifying data.

12. A network device comprising:
memory; and one or more processors coupled with the memory, the one or more processors being configured to:

process, a request, from a subscriber device, via a wireless connection device, for network parameters for accessing one or more services provided by a service provider network, the request for network parameters comprising identifying data associated with a subscriber of the service provider network;

output, to a service server, an authentication request for the subscriber device, the authentication request indicating the identifying data;

in response to receiving an authentication reply indicating the authentication request for the subscriber device has been approved and a service profile for the subscriber:
output, to the wireless connection device, configuration information corresponding to the service profile for the subscriber; and
output, to the subscriber device, network parameters for accessing the one or more services provided by the service provider network; and in response to a determination, by the one or more processors, of a bandwidth usage of the one or more services by the subscriber device, output, to the service server, an accounting message indicating the identifying data and the bandwidth usage of the one or more services by the subscriber device.

13. The network device of claim 12, wherein the identifying data of the request for network parameters comprises a subscriber identifier indicating the subscriber and wherein, to output the authentication request, the one or more processors are configured to output the authentication request to indicate the subscriber identifier.

14. The network device of claim 13, wherein the subscriber identifier comprises a user name, a user identifier, biometrics corresponding to the subscriber, or customer number.

15. The network device of claim 12, wherein the identifying data of the request for network parameters comprises a device identifier indicating the subscriber device.

16. The network device of claim 15, wherein, to output the authentication request, the one or more processors are configured to output the authentication request to indicate the device identifier.

17. The network device of claim 15, wherein the one or more processors are configured to:
determine a subscriber identifier based on the device identifier, wherein, to output the authentication request, the one or more processors are configured to output the authentication request to indicate the subscriber identifier.

18. The network device of claim 15, wherein the device identifier comprises one or more of a media access control (MAC) address, International Mobile Equipment Identity (IMEI), Mobile Station International Subscriber Directory Number (MSISDN), or subscriber identification module (SIM) identifier.

19. The network device of claim 15, wherein the wireless connection device determines a subscriber identifier indicating the subscriber based on a subscriber login by the subscriber using a software application or a Uniform Resource Locator (URL), wherein the wireless connection device maps a device identifier indicating the subscriber device to the subscriber identifier, and wherein the wireless connection device generates the request for network parameters to indicate the subscriber identifier.

20. The network device of claim 12, wherein the configuration information specifies a subscribed level of service for the subscriber, the subscribed level of service indicating one or more of a level of throughput or a level of latency.

21. The network device of claim 12, wherein the network parameters comprise an Internet protocol address, domain name system (DNS) server address, or a default gateway.

22. The network device of claim 12, wherein the request for network parameters comprises a Dynamic Host Configuration Protocol (DHCP) discover or DHCPv6 solicit packet indicating the identifying data.

23. The network device of claim 12, wherein the network device is a broadband network gateway and wherein the service server is a Remote Authentication Dial-In User Service (RADIUS) server or a diameter server.

24. A network system comprising:
a wireless connection device configured to forward, from a subscriber device, a request for network parameters for accessing one or more services provided by a service provider network, the request for network parameters comprising identifying data associated with a subscriber of the service provider network;
a service server configured to authenticate the subscriber device;
a network device comprising:
memory; and
one or more processors coupled with the memory, the one or more processors being configured to:
process the request for network parameters;
output, to the service server, an authentication request for the subscriber device, the authentication request indicating the identifying data;
in response to receiving an authentication reply indicating the authentication request for the subscriber device has been approved and a service profile for the subscriber:
output, to the wireless connection device, configuration information corresponding to the service profile for the subscriber, wherein the wireless connection device is configured to establish a wireless connection with the subscriber device according to the configuration information; and
output, to the subscriber device, network parameters for accessing the one or more services provided by the service provider network; and
in response to a determination, by the one or more processors, of a bandwidth usage of the one or more services by the subscriber device, output, to the service server, an accounting message indicating the identifying data and the bandwidth usage of the one or more services by the subscriber device.

25. The network device of claim 24, wherein the wireless connection device is configured to:
determine a subscriber identifier indicating the subscriber based on a subscriber login by the subscriber using a software application or a Uniform Resource Locator (URL);
map a device identifier indicating the subscriber device to the subscriber identifier; and
generate the request for network parameters to indicate the subscriber identifier.

26. A method comprising:
forwarding, by a wireless connection device, from a subscriber device, to a service server, via a network device, a request for accessing one or more services of a service provider network, the request for accessing services of the service provider network specifying a subscriber identifier for a subscriber and a device identifier for the subscriber device;

mapping, by the wireless connection device, the device identifier for the subscriber device to the subscriber identifier in an identifying data mapping table;

in response to receiving a request for network parameters for accessing the one or more services of the service provider network specifying the device identifier, generating, by the wireless connection device, a modified request for network parameters for accessing the one or more services of the service provider network that indicates the subscriber identifier mapped, by the identifying data mapping table, to the device identifier for the subscriber device; and outputting, by the wireless connection device, the modified request to the service server via the network device, wherein the network device outputs, to the service server, an accounting message indicating the subscriber identifier and a bandwidth usage of the one or more services by the subscriber device.

27. The method of claim 26, comprising:

receiving, by the wireless connection device, after outputting the modified request, from the network device, configuration information corresponding to a service profile for the subscriber;

configuring, by the wireless connection device, the wireless connection device to establish a wireless connection with the subscriber device based on the configuration information; and forwarding, by the wireless connection device, from the network device, to the subscriber device, network parameters for accessing the one or more services provided by the service provider network.

28. The method of claim 27, wherein the configuration information indicates one or more of a subscribed bandwidth or latency and wherein configuring the wireless connection comprises configuring the wireless connection with one or more of the subscribed bandwidth or latency.

29. The method of claim 26, wherein the subscriber identifier is generated by the subscriber device using a software application executing at the subscriber device or web browser directed to a Uniform Resource Locator (URL) for accessing services of the service provider network.

30. The method of claim 26, wherein the request for network parameters comprises a Dynamic Host Configuration Protocol (DHCP) discover or DHCPv6 solicit packet.

31. A wireless connection device comprising:

memory; and one or more processors coupled with the memory, the one or more processors being configured to:

forward, from a subscriber device, to a service server, via a network device, a request for accessing one or more services of a service provider network, the request for accessing services of the service provider network specifying a subscriber identifier for a subscriber and a device identifier for the subscriber device;

map the device identifier for the subscriber device to the subscriber identifier in an identifying data mapping table;

in response to receiving a request for network parameters for accessing the one or more services of the service provider network specifying the device identifier, generate a modified request for network parameters for accessing the one or more services of the service provider network that indicates the subscriber identifier mapped, by the identifying data mapping table, to the device identifier for the subscriber device; and output the modified request to the service server via the network device, wherein the network device outputs, to the service server, an accounting message indicating the subscriber identifier and a bandwidth usage of the one or more services by the subscriber device.

\* \* \* \* \*